(12) United States Patent
Jalade et al.

(10) Patent No.: US 7,109,609 B2
(45) Date of Patent: Sep. 19, 2006

(54) METHOD AND PULSE-CONTROL CIRCUIT FOR A POWER COMPONENT

(75) Inventors: Jean Jalade, Castanet-Tolosan (FR); Jean-Pierre Laur, Albi (FR); Jean-Louis Sanchez, Escalquens (FR); Patrick Austin, Bonrepos-Riquet (FR); Marie Breil, Toulouse (FR); Eric Bernier, Mettray (FR)

(73) Assignee: STMicroelectronics S.A., Montrouge (FR)

(*) Notice: Subject to any disclaimer, the term of this patent is extended or adjusted under 35 U.S.C. 154(b) by 341 days.

(21) Appl. No.: 10/415,442

(22) PCT Filed: Oct. 30, 2001

(86) PCT No.: PCT/FR01/03378

§ 371 (c)(1),
(2), (4) Date: Apr. 29, 2003

(87) PCT Pub. No.: WO02/37657

PCT Pub. Date: May 10, 2002

(65) Prior Publication Data

US 2004/0027005 A1    Feb. 12, 2004

(30) Foreign Application Priority Data

Oct. 31, 2000  (FR)  .................................. 00 14005

(51) Int. Cl.
*H01H 83/00*  (2006.01)
*H02B 1/24*  (2006.01)
(52) U.S. Cl. ...................................................... 307/125
(58) Field of Classification Search ................. 307/125
See application file for complete search history.

(56) References Cited

U.S. PATENT DOCUMENTS

| 3,093,747 | A | * | 6/1963 | Goodell ........................ 307/409 |
| 3,246,165 | A | * | 4/1966 | Widmayer ..................... 307/422 |
| 3,267,441 | A | * | 8/1966 | Busch ........................... 365/191 |
| 3,383,623 | A |   | 5/1968 | Vercellotti et al. |
| 4,642,616 | A | * | 2/1987 | Goodwin ....................... 340/654 |
| 5,831,349 | A |   | 11/1998 | Weng |

OTHER PUBLICATIONS

International Search Report from corresponding PCT application No. PCT/FR01/03378, filed Oct. 30, 2001.

* cited by examiner

*Primary Examiner*—Brian Sircus
*Assistant Examiner*—Dru Parries
(74) *Attorney, Agent, or Firm*—Lisa K. Jorgenson; James H. Morris; Wolf, Greenfield & Sacks, P.C.

(57) ABSTRACT

The invention concerns the control of thyristor-type semiconductor power components (Sw) powered by an alternating current network (VS). The control signal is a pulse (Ie). It is stored in the form of magnetic induction (B), positive or negative, in a core (T) made of ferromagnetic material. At each current alternation of the network, the interrogation of the magnetic state of the strand results in the presence, or not, of a control signal on the power device (Sw).

14 Claims, 7 Drawing Sheets

IGTH

METHOD AND PULSE-CONTROL CIRCUIT FOR A POWER COMPONENT

BACKGROUND OF THE INVENTION

1. Field of the Invention

The present invention relates to the control of semiconductor power components.

2. Discussion of the Related Art

The present invention more specifically relates to the pulse control of semiconductor power components used as switches and switching a load supplied by an A.C. network.

Current static power switches are thyristors and triacs. Structures derived from these devices are also used, which can combine several thyristors and use MOS transistors or bipolar transistors in the gate circuit.

Devices of thyristor type are reset in off position upon each zero crossing. On the assumption that the power switch must be maintained in on position, adequate control signals must be applied thereto upon each network halfwave.

SUMMARY OF THE INVENTION

An object of the present invention is to provide a circuit or a method enabling, from a single control pulse, ensuring the switch turning-on or turning-off for several halfwaves until an opposite order is provided.

Another object of the present invention is to provide such a circuit or method having the following features:

storing of the control signal with no time limitation;

storing that has reduced susceptibility to interferences in particular to outer electric disturbances and to temperature and mechanical conditions;

power required for the control system operation drawn from the outer power network;

galvanic isolation between the control signal and the network;

wide choice of the controlled power component.

To achieve these and other objects, the present invention provides storing of the control pulse or write pulse in the form of a magnetic induction in a torus made of a ferromagnetic material.

More specifically, the present invention provides a circuit for controlling a semiconductor power component, including a torus made of a ferromagnetic material having at least one input winding, at least one interrogation winding, at least one read winding intended to be connected to the control terminals of the power component, and at least one regeneration winding.

According to an embodiment of the present invention, the power component is inserted in an A.C. supplied power circuit, in which at least one of the interrogation windings receives a pulse of a determined polarity at the beginning of each halfwave of the voltage applied to the power circuit that the component is capable of conducting; and the regeneration windings are in series with the power component.

According to an embodiment of the present invention, the power component is a one-way conduction component that can be pulse-controlled and that is de-energized when the current flowing therethrough ceases.

According to an embodiment of the present invention, the power component is bidirectional and is inserted in an A.C. supplied power circuit, two windings are used to regenerate the magnetic state; and each regeneration winding conducts the current corresponding to one of the two halfwaves.

According to an embodiment of the present invention, the power component is formed of two thyristors assembled in parallel and in opposition, the read winding controls a bipolar transistor connected to supply the thyristor gates; and a regeneration winding is connected in series with each thyristor.

According to an embodiment of the present invention, the power component is a triac, the read winding is connected to the triac gate; and two diodes mounted connnected head-to-tail are connected in series with the two regeneration windings.

According to an embodiment of the present invention, the power component is formed of two thyristors controlled by a MOS transistor, the two thyristors are connected in series and in opposition; each thyristor is connected, separately, to a read winding and to a regeneration winding; and a diode is connected in parallel to each thyristor and its associated regeneration winding.

The present invention also provides a method for controlling a semiconductor power component, including the steps of:

providing a torus made of a ferromagnetic material with at least four windings;

applying, to a first winding, a positive or negative write pulse;

applying to a second winding an interrogation pulse of determined polarity;

using as an electric control signal the voltage appearing on a third winding and resulting from the application of the interrogation pulse; and regenerating on a fourth winding the magnetic state prior to the interrogation.

BRIEF DESCRIPTION OF THE DRAWINGS

The foregoing objects, features and advantages of the present invention will be discussed in detail in the following non-limiting description of specific embodiments in connection with the accompanying drawings, in which.

DETAILED DESCRIPTION

Similar elements are indicated with the same references in the various drawings.

To simplify the discussion, and as an example, no phase shift between the current and the voltage is taken into account in the timing diagrams. Further, it is assumed that an almost steady state is reached at each moment for the complete system, and that there is no conflict between the different electric signals.

Figure 1:
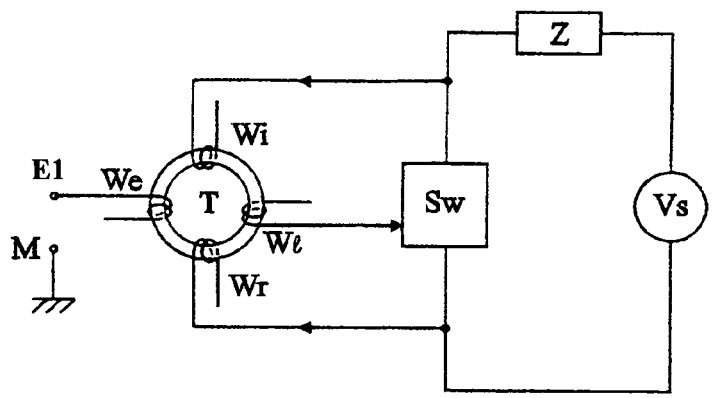
FIG. 1 schematically shows a control circuit according to the present invention.

FIG. 1 shows a system for controlling a semiconductor component Sw, according to the present invention. This component is placed in series with a load Z, supplied by an A.C. network Vs. The control system includes a torus T formed in a ferromagnetic material associated with at least four windings We, Wi, Wl, Wr.

Winding We, called the write winding, is connected to input E1 of the system. Winding Wi, called the interrogation winding, is connected to the A.C. network. Winding Wl, called the read winding, is connected to the control of power device Sw. The current in winding Wr, called the regeneration winding, is linked to the current running through load Z.

The operation of the control circuit is the following.

In a write phase, a pulse applied at E1 creates a magnetic induction in torus T, through write winding We. The direction of this induction depends on the pulse direction: it is positive or negative according to whether the turning-on or the turning-off of switch Sw is desired to be controlled.

An interrogation phase takes place, in the general case, at the beginning of each halfwave of the network. During this interrogation phase, winding Wi is connected to the network so that a magnetic induction, for example, positive, is imposed in torus T.

In a read phase, the variation of the magnetic induction flux, generated in the torus during the interrogation phase, is taken into account by read winding Wl. If this variation is null, there is no electric read signal. If this variation is not null, an electromotive force appears across Wl. This electromotive force creates a voltage or a current enabling turning switch Sw on.

If, after the read phase, switch Sw is on, this means that a change in the magnetic induction has occurred during the interrogation phase. It is thus necessary, to find again in the torus the magnetic induction state prior to the interrogation phase, to regenerate this former state. This is done by means of winding Wr, which uses the current running through switch Sw. This regeneration forms the fourth phase of the control cycle.

The system state after the regeneration phase is identical to that which existed after the phase of application of the write pulse. At the next network halfwaves, the interrogation, read and regeneration phases will be reproduced as long as no other write pulse is applied. Thus, if the pulse applied on input E1 corresponds to an order for turning on power switch Sw, said switch will be turned on upon each network halfwave without it being necessary to repeat the write pulse and with no time limitation. A new pulse on input E1 will provide no state switching of switch Sw if it is identical to the preceding one and will invert this state if it is of a sign opposite to the preceding one with a sufficient amplitude.

The control of the magnetic induction in the torus, according to the present invention, will now be detailed.

Figure 2A:
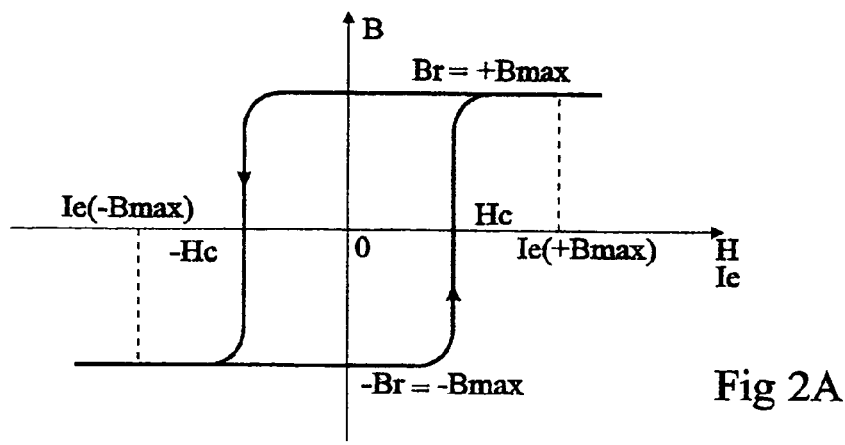
FIG. 2A shows a hysteresis cycle in a saturated ferromagnetic material.

FIG. 2A shows hysteresis cycle $B=f(H)$ in a ferromagnetic material having a rectangular hysteresis cycle.

When a ferromagnetic material is submitted to a magnetic field H, this results in a magnetic induction B in the material. For a sufficiently high positive magnetic field, greater than coercive field Hc, the magnetic induction saturates at a level +Bmax and practically no longer increases, even if the magnetic field increases. When the magnetic field becomes null again, a remanent induction Br practically equal to +Bmax remains for ferromagnetic materials having a rectangular hysteresis cycle. When the magnetic field keeps on decreasing, the magnetic induction remains at its level (+Bmax) as long as the applied magnetic field is not smaller than coercive field −Hc. When the magnetic field becomes smaller than coercive field −Hc, the magnetic induction switches from +Bmax to −Bmax. This last value is maintained even if the magnetic field becomes null. In short, the ferromagnetic materials preferred for the present invention have an almost rectangular hysteresis cycle $B=f(H)$ with a remanent induction equal to the maximum induction created by the magnetic field. In the absence of an applied magnetic field, there are two stable states for the induction, +Bmax and −Bmax. These states correspond to a magnetic saturation state, and they only depend on the material used.

Figure 2B:
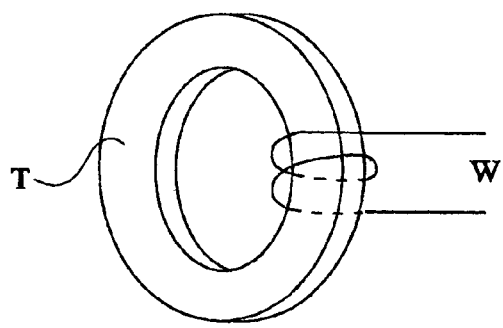
FIG. 2B shows a torus with a winding.

FIG. 2B is a perspective view of a torus T usable in the present invention. The windings are formed of a few spirals of an isolated electric lead surrounding the ferromagnetic material of the torus. When an electric current runs through such a winding, a magnetic field proportional to the current is generated in the torus. Thus, in FIG. 2A, the intensity of the current running through a winding can be substituted to the magnetic field. Ie(+Bmax) is defined as the minimum intensity of the write current enabling obtaining an induction +Bmax. Similarly, Ie(−Bmax) is the intensity of the write current generating an induction −Bmax. For any value of the write current respectively greater than Ie(+Bmax) and smaller than Ie(−Bmax), the write current pulse will be stored in the form of a remanent magnetic induction in the torus.

Figure 2C:
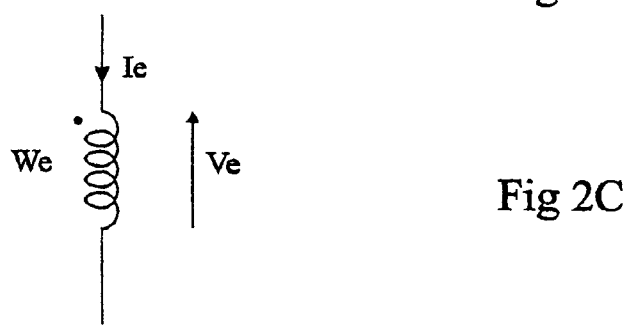
FIG. 2C shows the electric diagram of a winding and indicates the conventions for the winding direction, the current direction and the direction of the voltage across this winding.

In FIG. 2C, the torus and winding We are schematized by the representation of a self-induction coil. By convention, the current is positive when its comes in by the end with a dot of the self-induction coil. The dot on the self-induction coil provides the winding direction. By convention, for a positive current Ie, the magnetic field is positive. A possible electromotive force Ve is shown, with its positive direction in FIG. 2C.

Figure 3:
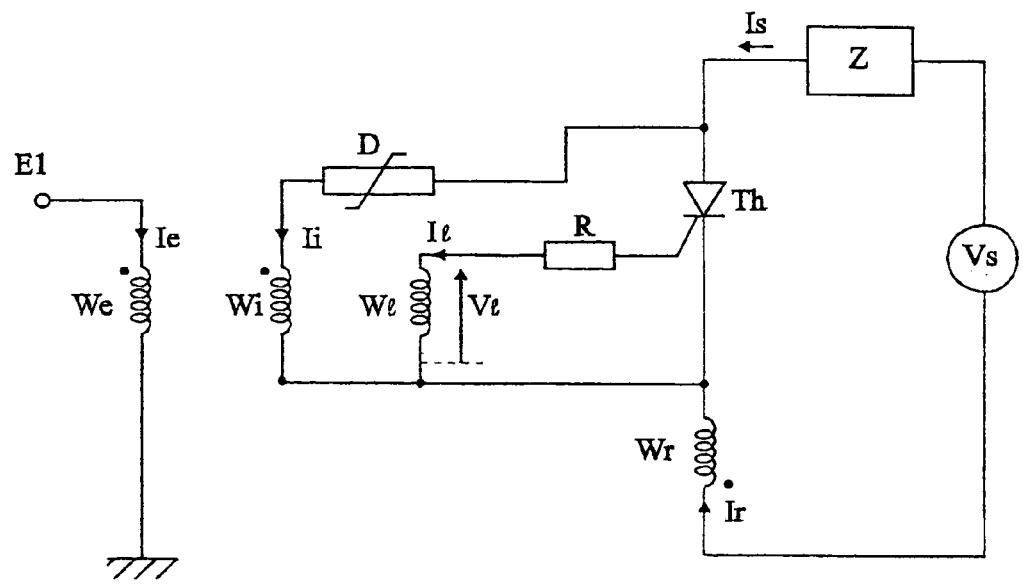
FIG. 3 shows a first embodiment of the present invention.

FIG. 3 is an electric diagram of a first embodiment of the present invention. The semiconductor power component used as a switch is a thyristor Th. The control of this thyristor is formed by a torus including four windings We, Wi, Wl, Wr.

Winding We is connected to input El. A negative pulse of write current Ie running through We is assumed to control the on state of the thyristor. Accordingly, a positive pulse Ie must control the off state of the thyristor.

Interrogation winding Wi is connected between the anode and the cathode of the thyristor. A device D is provided in series with winding Wi. Device D has two functions. On the one hand, device D only lets through the current at the beginning of each positive halfwave of the network, and on the other hand, device D limits the current in winding Wi. Many solutions exist to implement this current limiter and breaker function, especially those described in patents EP0780,952 or FR9,609,132, which are incorporated herein by reference. Thus, the state of the magnetic induction will be interrogated at the beginning of each positive halfwave of the network. Positive halfwaves correspond to the conductive direction of the thyristor. The direction of the windings of FIG. 3 shows that this interrogation is performed by imposing a positive magnetic induction.

Read winding W1 is connected in parallel between the cathode and the gate of the thyristor. Preferably, a resistor R limits the current in this branch of the circuit.

In case of a variation in the flux of the magnetic induction during the interrogation phase, winding W1 generates a positive electromotive force and afterwards a negative current in the thyristor gate. This gate current only exists if the write pulse has generated a negative magnetic induction. This current turns the thyristor on during the positive halfwave.

Regeneration winding Wr is connected in series with the thyristor. It conducts main current Is. The winding direction of Wr is such that, in the case where the thyristor is on, the magnetic induction generated by current Is in winding Wr is negative. The magnetic state prior to the interrogation is thus regenerated.

FIGS. 4A, 4B, 4C, 4D, 4E, and 4F show the voltages, magnetic induction, and currents at various points of the circuit of FIG. 3.

Figure 4A:
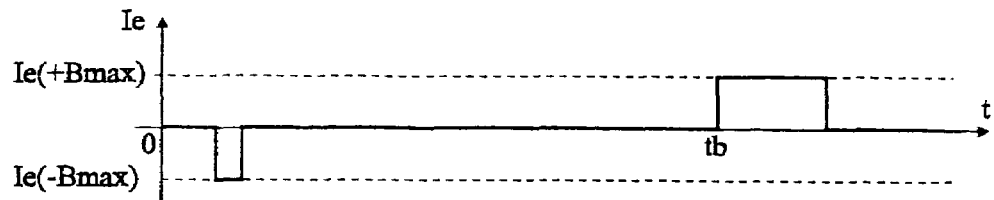
FIG. 4A shows the timing diagram of the write current of the first embodiment.

The timing diagram of FIG. 4A shows, at time ta, a negative current pulse Ie, applied on input E1, and intended for turning on the thyristor. At time tb, a positive current pulse is applied to turn off the thyristor.

Figure 4B:
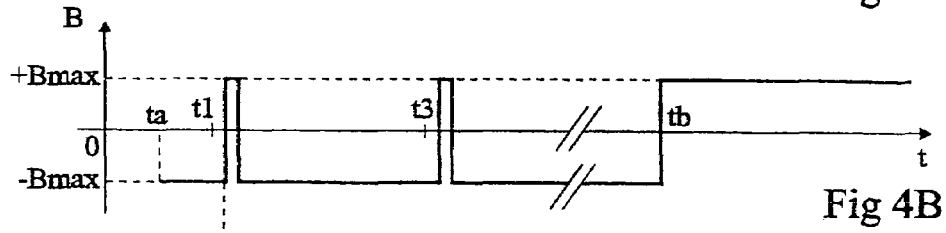
FIG. 4B shows the timing diagram of the magnetic induction in the torus of the first embodiment.

The timing diagram of FIG. 4B shows magnetic induction B in the torus. This induction is negative just after time ta and positive after time tb.

Figure 4C:
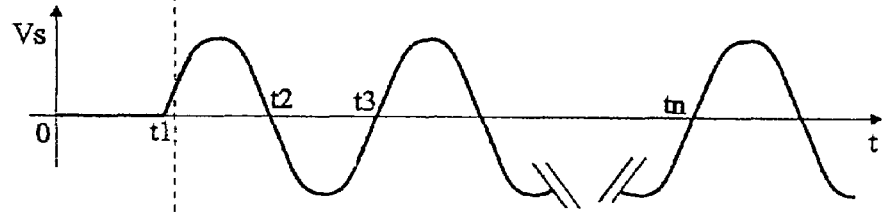
FIG. 4C shows the timing diagram of the halfwaves of the load supply network.

The timing diagram of FIG. 4C shows voltage Vs of the A.C. network. In particular, time t1 is the beginning of the first positive halfwave after time ta. Time t2 corresponds to the end of this first positive halfwave. Time t3 corresponds to the beginning of the second positive halfwave.

Figure 4D:
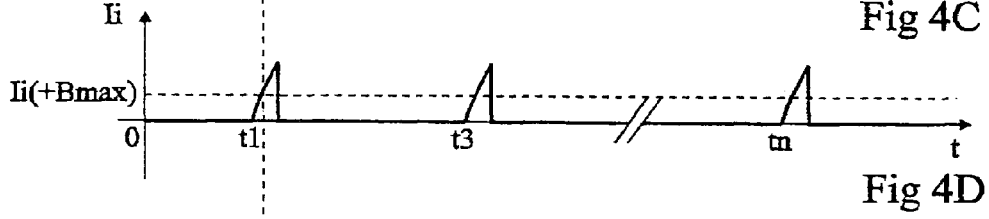
FIG. 4D shows the timing diagram of the interrogation current according to the first embodiment.

The timing diagram of FIG. 4D shows current Ii in interrogation winding Wi. At time t1, the thyristor is off since there is no voltage thereacross and main current Is assumed to be null. As the network voltage increases, this voltage is present across current limiter and breaker device D. Device D lets through current Ii as long as it is smaller than Ii(+Bmax). For Ii greater than Ii(+Bmax), device D cuts off the current in winding Wi. At the time where Ii is equal to Ii(+Bmax), the magnetic field in the torus switches from −Bmax to +Bmax, as shown by the timing diagram of FIG. 4B.

Figure 4E:
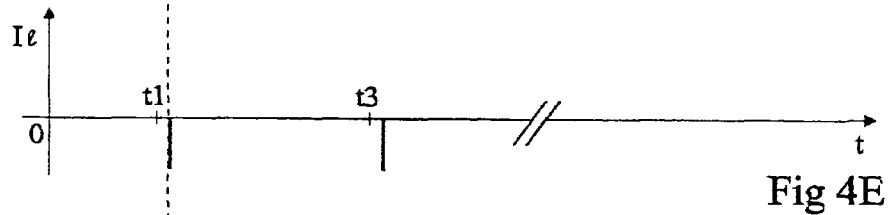
FIG. 4E shows the timing diagram of the read current according to the first embodiment.

There then is a strong flux variation of the magnetic induction and the read winding generates a negative current Il, as shown by the timing diagram of FIG. 4E. This current injected into the thyristor gate thus turns it on at the beginning of each positive halfwave.

Figure 4F:
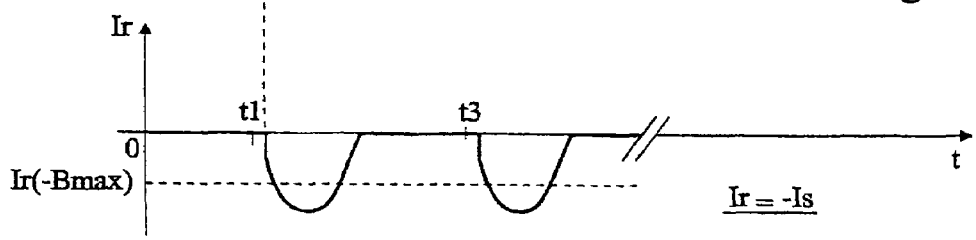
FIG. 4F shows the timing diagram of the current switched in the load according to the first embodiment.

The current in the thyristor is, apart for a sign difference, the current in the regeneration winding. The timing diagram of FIG. 4F shows this regeneration current which remains until end t2 of the positive halfwave. It imposes a negative magnetic induction −Bmax in the torus, as illustrated by the timing diagram of FIG. 4B.

During the negative halfwave, there is no interrogation since device D does not let the current through and the magnetic state of the torus thus remains unchanged.

At the beginning of the next positive halfwave, at time t3, the cycle starts again.

After time tb, the interrogation creates no flux variation of the magnetic induction, there is no current in the thyristor gate and said thyristor remains off.

Figure 5:
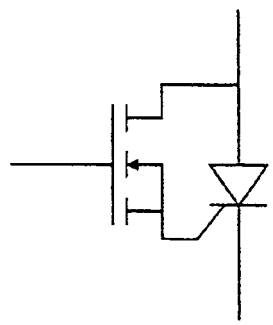
FIG. 5 shows an isolated control gate thyristor (IGTH) usable in the first embodiment.

According to an alternative of this first embodiment, thyristor Th is replaced with a thyristor controlled by a MOS transistor. The diagram of such a device forming an isolated gate thyristor (IGTH) is shown in FIG. 5. The operation is similar to that of the first embodiment. Winding W1 must then generate a voltage greater than the threshold voltage of the MOS transistor to turn the thyristor back on. This voltage is proportional to the number of spirals in winding W1 and is thus easy to adjust.

Figure 6:
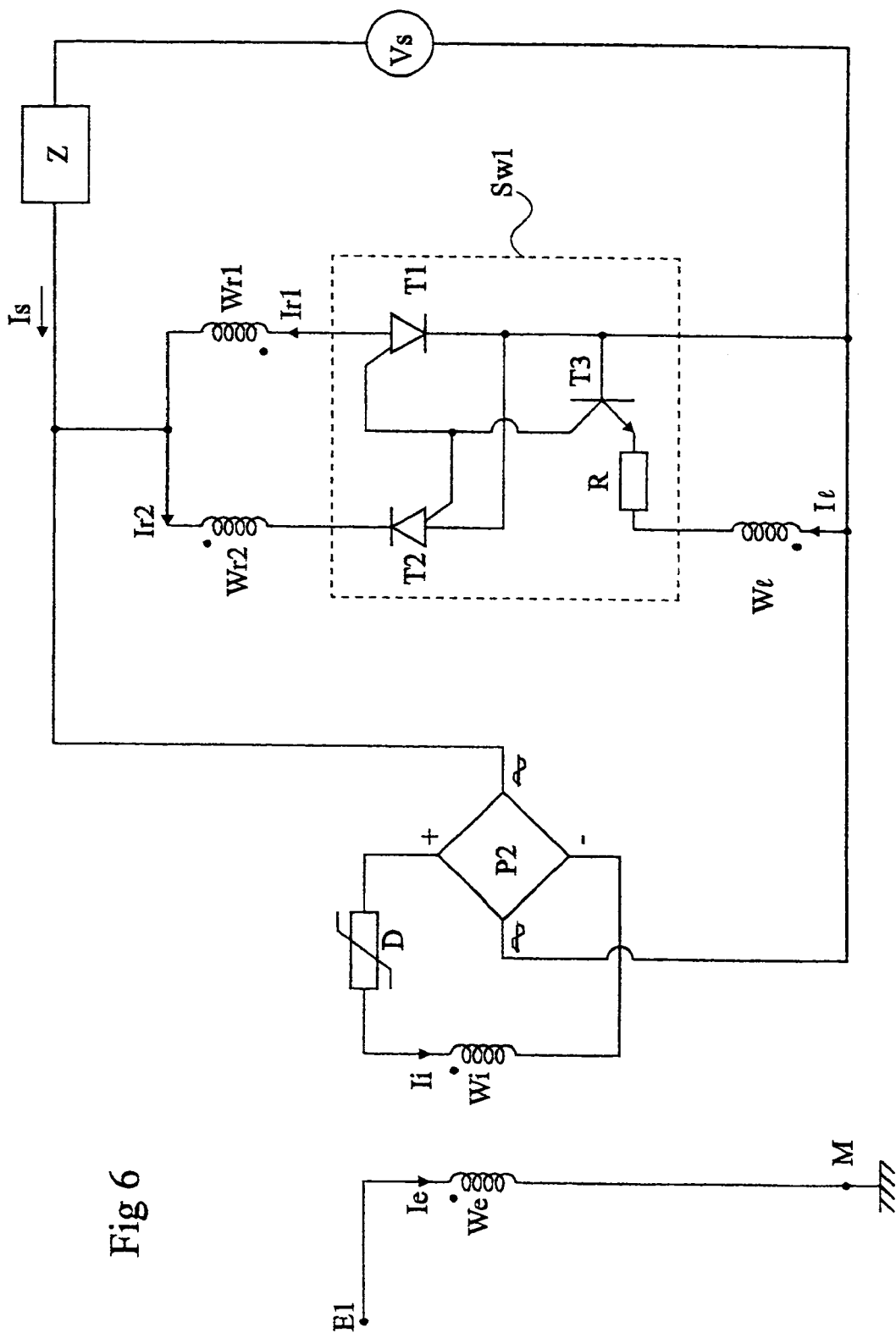
FIG. 6 shows a second embodiment of the present invention where the power device is a device switching an A.C. current.

The present invention is likely to adapt to many semiconductor power devices. Thus, FIG. 6 shows a second embodiment of the present invention. In this second embodiment, the power device operates with both network halfwaves. Device SW1 is formed of two anode-gate thyristors, T1 and T2, assembled in parallel and in opposition, each being capable of conducting the current corresponding to one of the two network halfwaves. The gates of these two thyristors are interconnected and connected to the collector of a bipolar control transistor T3. The cathode of thyristor T1 is connected to the anode of thyristor T2 and to the base of transistor T3. The anode of thyristor T1 and the cathode of thyristor T2 are interconnected through, respectively, windings Wr1 and Wr2.

The control of this bidirectional power device uses a torus with windings We, Wi, W1, Wr1 and Wr2. Winding We is connected to the input and its operation has been described in relation with FIG. 3. The magnetic state interrogation is performed by means of winding Wi. However, since the system must operate on both network halfwaves, winding Wi is connected across the power switch through a fullwave rectifying bridge P2. Another equivalent solution consists of using two windings Wi, each powered by one of the two halfwaves through a diode and connected so that the generated magnetic induction is always positive.

The read winding may generate a current between the base and the emitter of transistor T3. This current turns on transistor T3 and enables flowing of current through the gate of one of thyristors T1 and T2.

Finally, windings Wr1 and Wr2, respectively inserted in the anode and the cathode of thyristors T1 and T2, enable, each for a halfwave, regeneration of the negative magnetic induction in the torus in case the corresponding thyristor is turned on.

Figure 7:
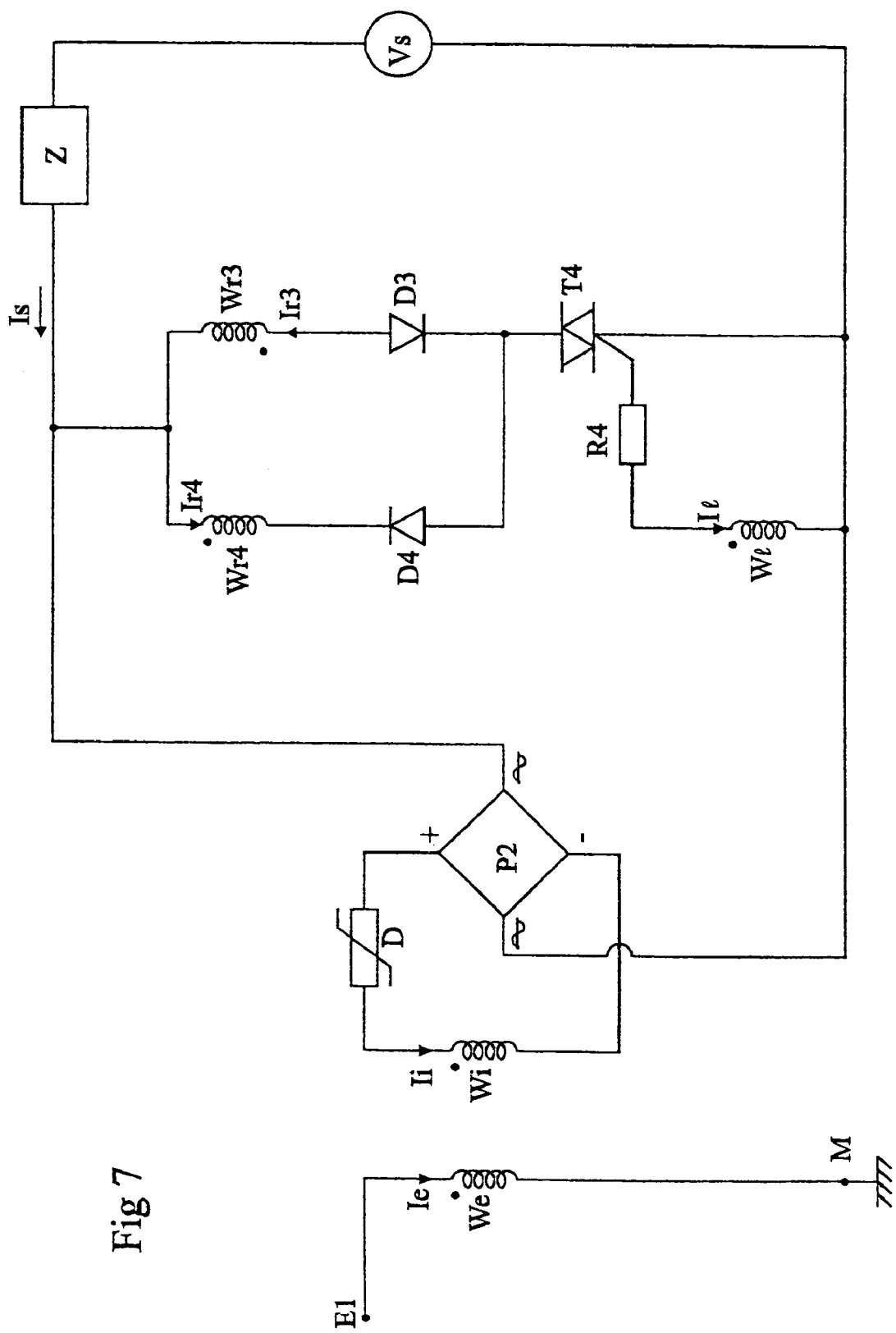
FIG. 7 shows a third embodiment of the present invention where the power device is a triac.

FIG. 7 shows a third embodiment of the present invention using a bidirectional device of triac type. The triac gate is connected to read winding W1 and is started by the current induced in this winding during the read phase. During the magnetic induction regeneration phase, the current corresponding to the positive halfwave is distinguished from that corresponding to the negative halfwave of the supply network. Two diodes D3 and D4 in opposition, respectively in series with a regeneration winding Wr3, Wr4, only let a current through this winding for a determined polarity of the power supply.

The present invention is adaptable to many one-way devices assembled in such a way that they use both halfwaves of the A.C. network. Such assemblies are shows in FIGS. 8A and 8B. The devices chosen in these examples are thyristors controlled by an isolated gate MOS transistor. These devices are remarkable since they enable control of the variation of current di/dt and they thus do not electrically pollute the network on which they are connected.

Figure 8A:
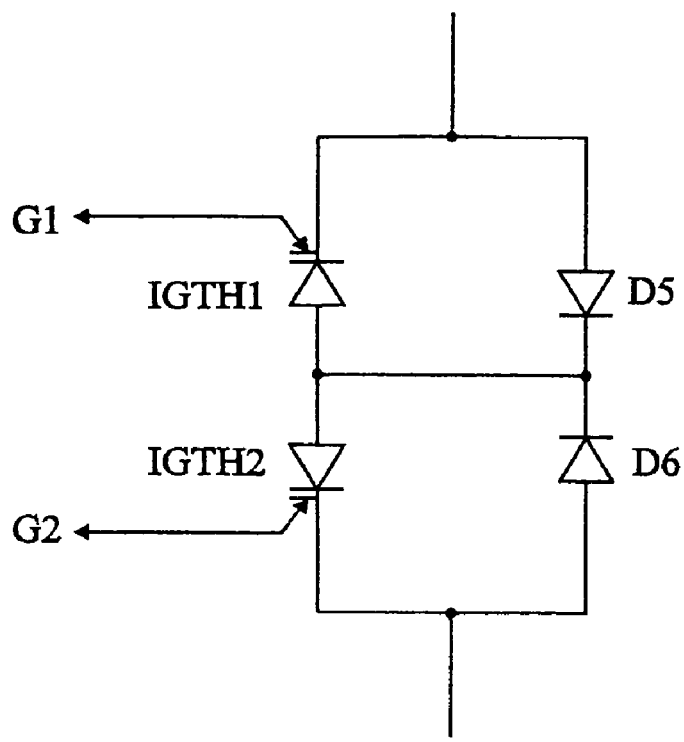
FIG. 8A provides a generic diagram for switching the two halfwaves based on one-way power devices.

FIG. 8A shows two thyristors IGTH1 and IGTH2 controlled by a MOS transistor and assembled in series and in opposition. The anode of thyristor IGTH1 is connected to the anode of thyristor IGTH2. Two diodes D5 and D6 are placed in parallel on thyristors IGTH1 and IGTH2, respectively. These diodes are connected in opposition on the thyristors so that when thyristor IGTH1 is on, diode D5 is blocked. Thus, referring to FIG. 8A, the current can cross diode D6 and thyristor IGTH1 or diode D5 and thyristor IGTH2 according to its direction. This type of assembly enables bidirectional use of the two thyristors controlled by a MOS transistor.

Figure 8B:
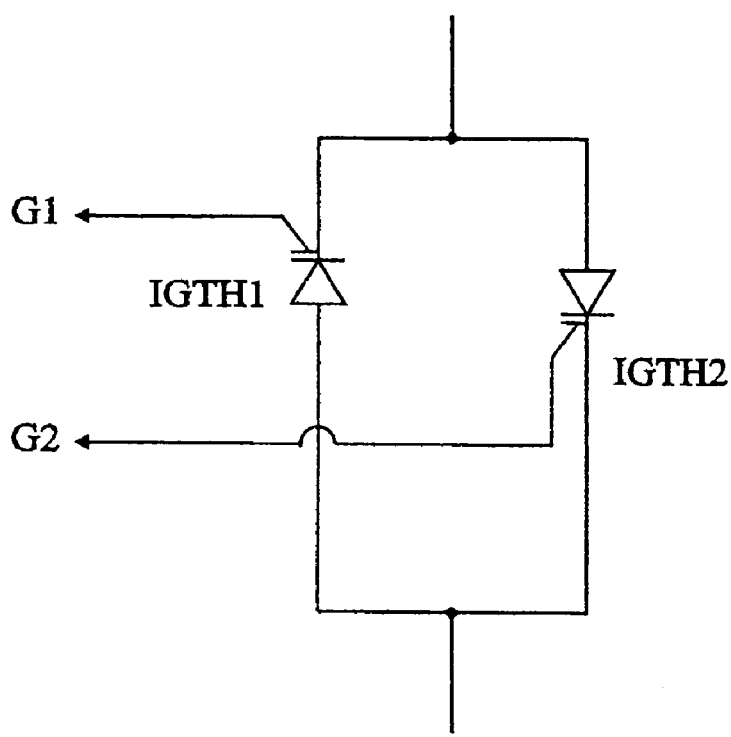
FIG. 8B provides a second generic diagram for switching the two halfwaves of an A.C. voltage source based on one-way power devices.

The same result can be obtained by assembling in parallel and in opposition thyristors IGTH1 and IGTH2 as in FIG. 8B. In this case, each thyristor must stand a reverse voltage that can be significant.

Figure 9:
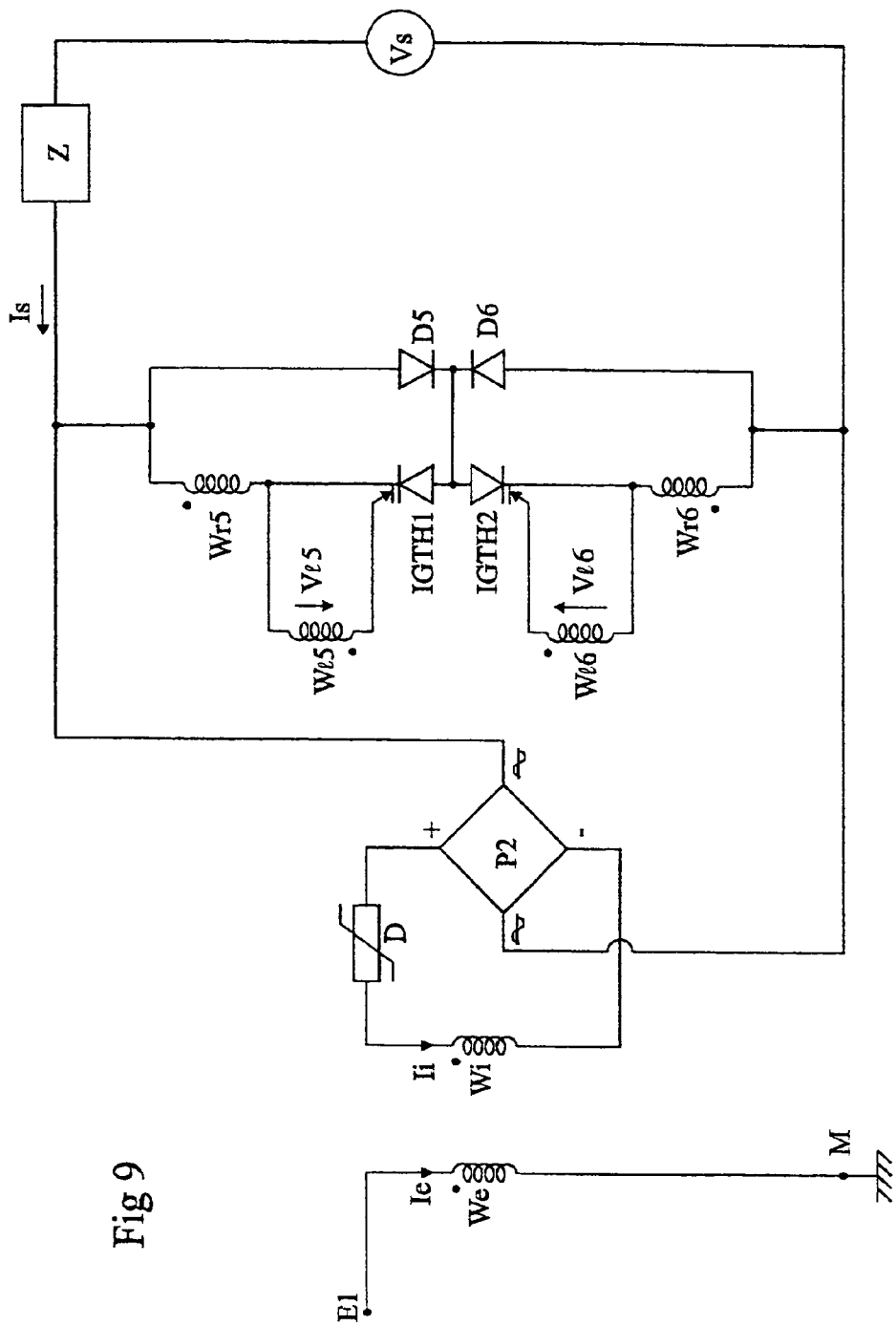
FIG. 9 shows a fourth embodiment of the present invention where two IGTH devices are used to control the two network halfwaves.

FIG. 9 shows a fourth embodiment of the present invention. Two thyristors IGTH1 and IGTH2 controlled by a MOS transistor are assembled as in FIG. 8A. The control of these thyristors is performed by using a torus made of a ferromagnetic material which includes the following windings: We, Wi, Wl5 and Wl6, Wr5 and Wr6. The system shown in FIG. 9 uses both network halfwaves. The connections and functions of windings We and Wi have been described previously, especially with the description of FIGS. 6 and 7. Two windings Wl5 and Wl6 take part in the read phase. They are placed between the control gate and the cathode of respective thyristors IGTH1 and IGTH2. These windings develop voltages Vl5 and Vl6 greater than the threshold voltage of the MOS transistors controlling the turning-on of the thyristor. The regeneration of the former magnetic state is performed by means of windings Wr5 and Wr6. Winding Wr6 conducts the main current Is of the load when positive; current Is then flows through D5, IGTH2, and Wr6; there is no current in the branch formed of Wr5, IGTH1, and D6. When Is is negative, it only crosses Wr5, IGTH1, and D6. The direction of windings Wr5 and Wr6 is such that a negative magnetic induction is regenerated.

Of course, the present invention is likely to have various alterations, modifications, and improvements which will readily occur to those skilled in the art. the type of semiconductor device switching the current and the control electronics specific to these devices are not limited. The number of windings of type We, Wi, Wl, and Wr is not limited. The present invention can easily be adapted to many types of A.C. networks characterized by the frequency, the waveform, and the phase number of the voltage. Load Z may be complex and not only resistive. Torus T may be replaced by any equivalent device made of a ferromagnetic material.

Having thus described at least one illustrative embodiment of the invention, various alterations, modifications, and improvements will readily occur to those skilled in the art. Such alterations, modifications, and improvements are intended to be within and scope of the invention. Accordingly, the foregoing description is by way of example only and is not as limiting. The invention is limited only as defined in the following claims and the equivalents thereto.

What is claimed is:

1. A circuit for controlling a semiconductor power component, including a torus made of a ferromagnetic material having at least one input winding for connection to an AC network, at least one interrogation winding, at least one read winding for connection to the control terminals of the power component, and at least one regeneration winding intended to be linked to the current running through a load of the power component, and at least one write winding presenting a galvanic isolation intended for creating a magnetic induction in the torus in order to define a state of the control terminal.

2. The control circuit of claim 1, in which the power component is inserted in an A.C. supplied power circuit, wherein:

at least one of the interrogation windings receives a pulse of a determined polarity at the beginning of each halfwave of the voltage applied to the power circuit that the component is capable of conducting; and the regeneration windings are in series with the power component.

3. The control circuit of claim 2, wherein the power component is a one-way conduction component that can be pulse controlled and that is de-energized when the current flowing therethrough crosses zero.

4. The control circuit of claim 2, in which the power component is bidirectional and is inserted in an A.C. supplied power circuit, wherein:

two windings are used to regenerate the magnetic state; and each regeneration winding conducts the current corresponding to one of the two halfwaves.

5. The control circuit of claim 4, in which the power component is formed of two thyristors assembled in parallel and in opposition, wherein:

the read winding controls a bipolar transistor connected to supply the thyristor gates; and a regeneration winding is connected in series with each thyristor.

6. The control circuit of claim 4, in which the power component is a triac wherein:

the read winding is connected to the triac gate; and two diodes mounted head-to-tail are placed in series with the two regeneration windings.

7. The control circuit of claim 4, in which the power component is formed of two thyristors controlled by a MOS transistor, wherein:

the two thyristors are placed in series and in opposition;

each thyristor is connected, separately, to a read winding and to a regeneration winding; and a diode is placed in parallel with each thyristor and its associated regeneration winding.

8. A method for controlling a semiconductor power component, wherein it includes the steps of:

providing a torus made of a ferromagnetic material with at least four windings;

applying, to a first winding, a positive or negative write pulse;

applying to a second winding an interrogation pulse of a determined polarity;

using as an electric control signal a voltage appearing on a third winding and resulting from application of the interrogation pulse; and regenerating on a fourth winding a magnetic state prior to the interrogation.

9. The control method of claim 8, wherein the semiconductor power device turns off when the voltage thereacross crosses zero.

10. The control method of claim 8, wherein the voltage of the network in which the power device is inserted periodically gets nul.

11. The control method of claim 8, wherein the voltage of the network in which the power device is inserted is an A.C. voltage.

12. The control method of claim 8, wherein several windings are used to take into account write pulses, the direction of each winding depending on the sign of these pulses.

13. The control method of claim 8, wherein the second winding is supplied from an A.C. network through a rectifying bridge.

14. The control method of claim 8, wherein the second winding is supplied through a device having a function of limiting the current.

* * * * *

UNITED STATES PATENT AND TRADEMARK OFFICE
CERTIFICATE OF CORRECTION

PATENT NO. : 7,109,609 B2 Page 1 of 1
APPLICATION NO. : 10/415442
DATED : September 19, 2006
INVENTOR(S) : Jean Jalade et al.

It is certified that error appears in the above-identified patent and that said Letters Patent is hereby corrected as shown below:

Column 6, line 36 should read:
rectifying bridge P2. Another equivalent solution includes Column 6, line 36, delete "Consists of".

Signed and Sealed this

Third Day of July, 2007

JON W. DUDAS
*Director of the United States Patent and Trademark Office*